UNITED STATES PATENT OFFICE.

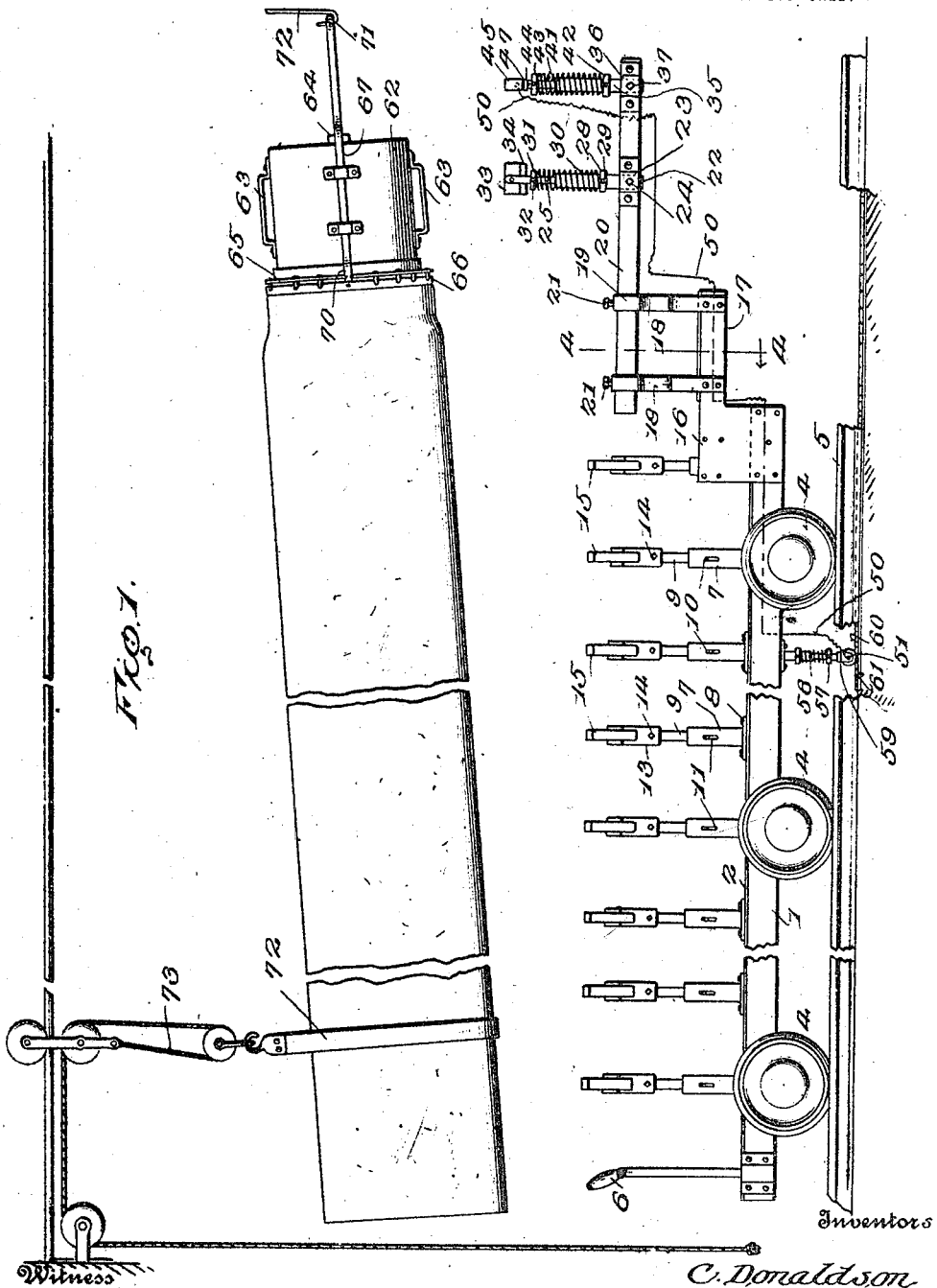

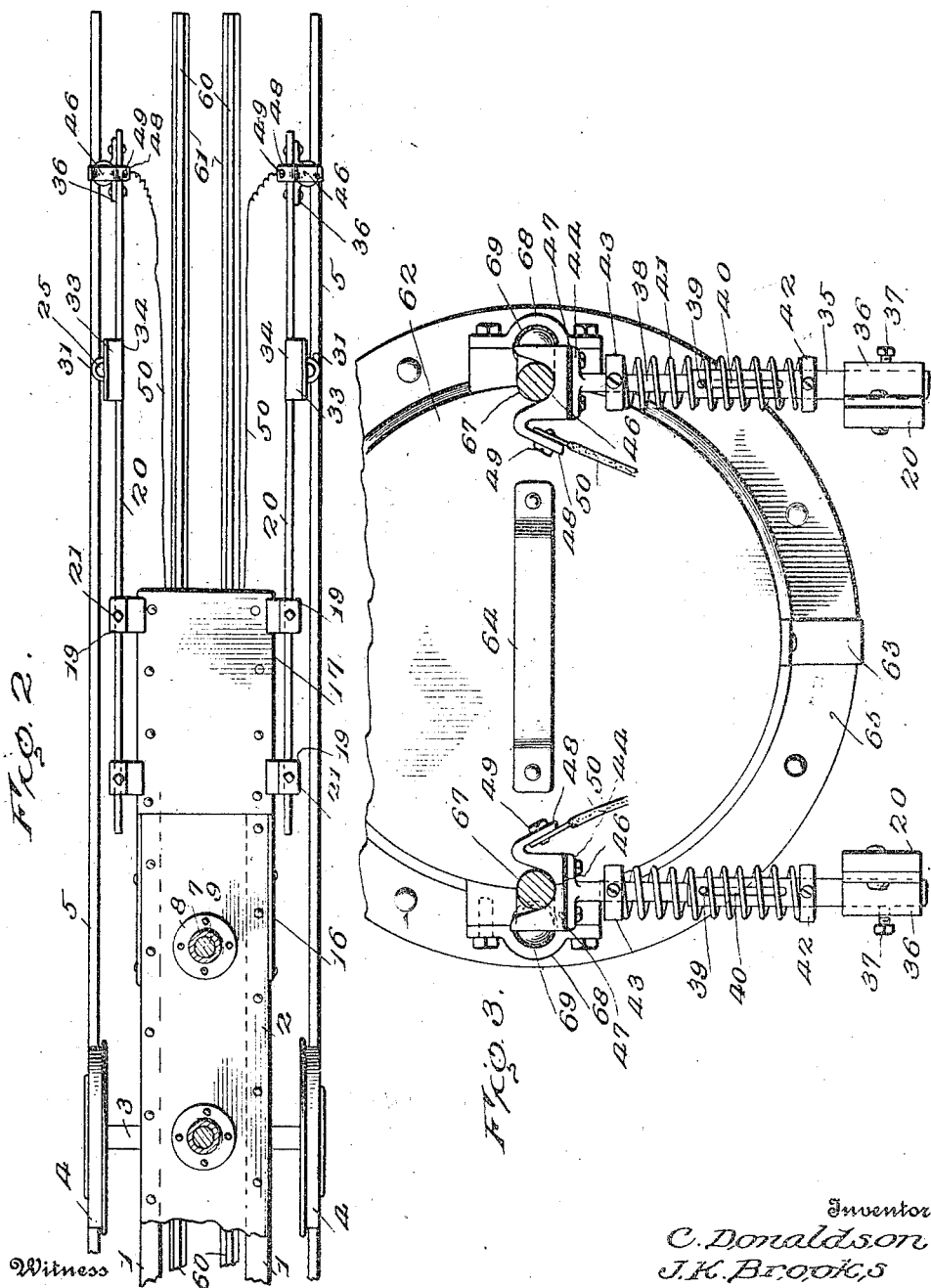

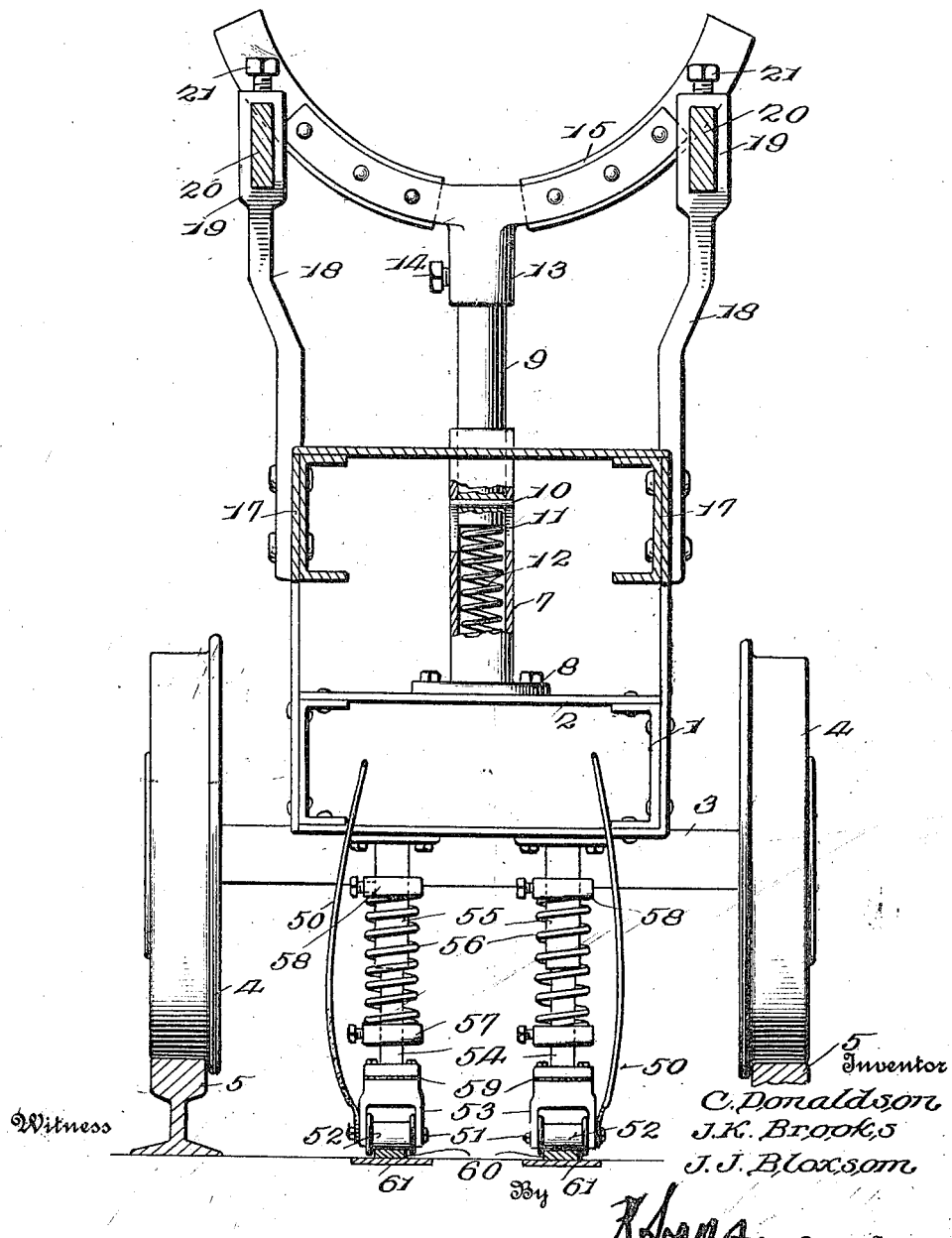

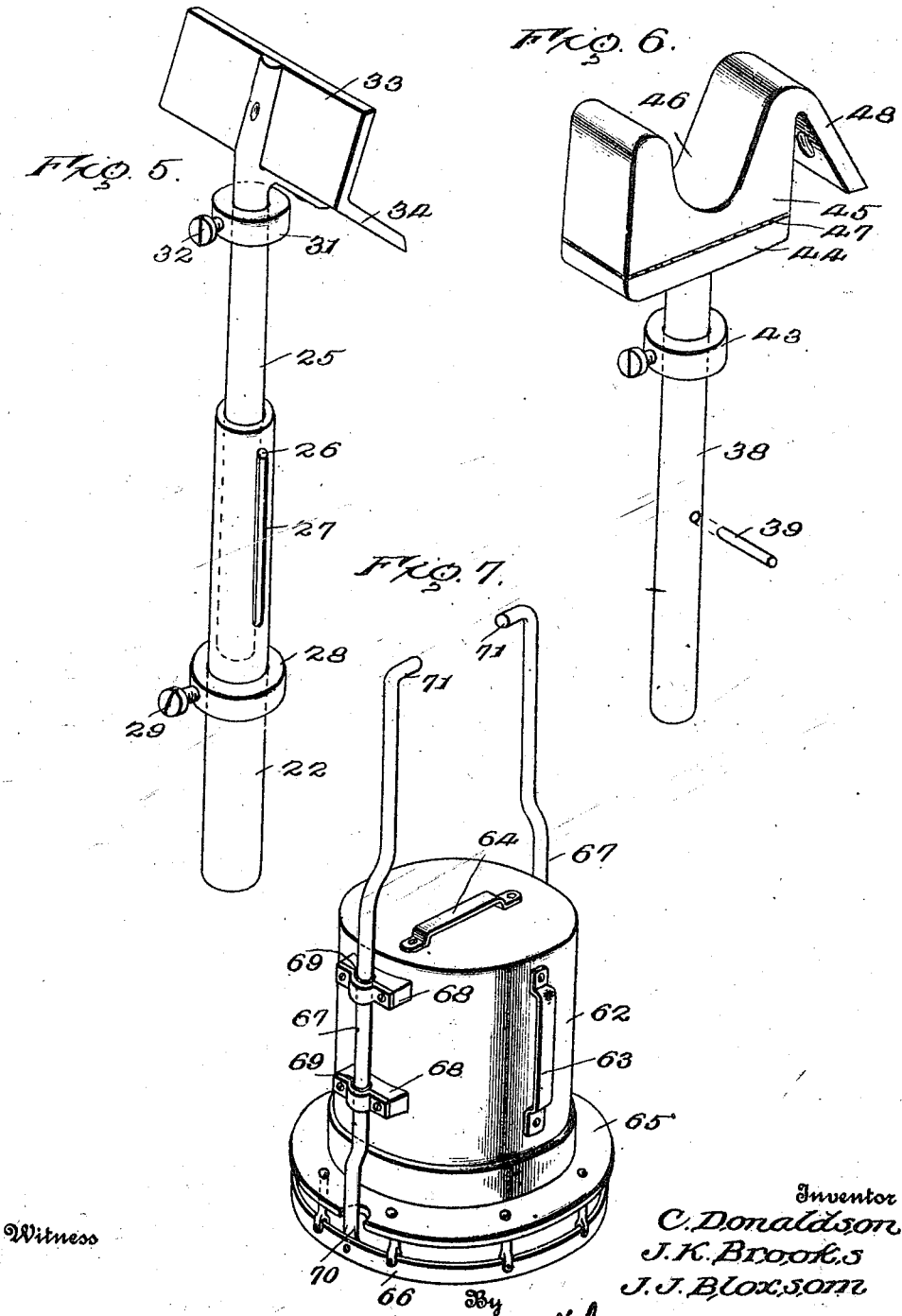

CHARLES DONALDSON, JOHN J. BLOXSOM, AND JOHN K. BROOKS, OF BROOKVILLE, PENNSYLVANIA, ASSIGNORS OF ONE-FOURTH TO ELMER E. MYERS, OF BROOKVILLE, PENNSYLVANIA.

GLASS APPARATUS.

1,311,804.      Specification of Letters Patent.      Patented July 29, 1919.

Application filed April 26, 1917. Serial No. 164,774.

*To all whom it may concern:*

Be it known that we, CHARLES DONALDSON, JOHN J. BLOXSOM, and JOHN K. BROOKS, citizens of the United States, residing at Brookville, in the county of Jefferson and State of Pennsylvania, have invented certain new and useful Improvements in Glass Apparatus, of which the following is a specification.

This invention relates to apparatus for use in the manufacture of sheet glass by that process in the carrying out of which the glass is first drawn in the form of a cylinder and then cut and flattened and the primary aim of the invention is to provide apparatus which will facilitate the handling of the cylinder after it has been drawn and during the capping operation. Ordinarily at least three men are required to handle each cylinder after it has been drawn and while it is being placed in position for capping and for detachment of the bait. The present invention, therefore, aims to provide apparatus whereby this work may be accomplished by one man more expeditiously than in the ordinary manner and with little or no likelihood of loss due to breaking of the cylinder.

Another aim of the invention is to provide apparatus for the purpose above mentioned embodying a horse upon which the cylinder is to be laid after it has been drawn and cut off from the melting pot, the horse being provided with a reheater for reheating the bait, the reheater being automatically rendered active upon disposal of the bait thereon and at the time the cylinder is disposed upon the horse.

Another object of the invention is to provide in apparatus of the class mentioned, means for supplying heat to the bait practically continuously during the drawing of the cylinder and up to the time of making the first cut for the purpose of separating the bait from the cylinder.

In the accompanying drawings:

Figure 1 is a view in side elevation of the apparatus, the horse and reheater being in position to respectively receive the cylinder and bait;

Fig. 2 is a top plan view of the forward end of the horse and the reheater;

Fig. 3 is a front elevation of the reheater, the bait being in position therein and the electrical leads for the bait being shown in section;

Fig. 4 is a detail vertical transverse sectional view on the line 4—4 of Fig. 1;

Fig. 5 is a perspective view of one of the supports for the bait;

Fig. 6 is a similar view of a portion of one of the supports for the bait leads;

Fig. 7 is a perspective view of the bait.

The horse of the apparatus comprises a framework of suitable construction, indicated in general by the numeral 1, and supporting a flooring, indicated by the numeral 2. The frame 1 is supported by suitable axles 3 which carry wheels 4 traveling upon rails 5, the rails being suitably arranged with relation the melting pot so as to permit of travel of the horse toward and from the said pot. The horse may be moved along the track comprising the rails 5 by any suitable power mechanism or by hand, in which latter event the frame 1 will preferably be provided at its rear end with a handle bar 6 which the workman may grasp for the purpose stated. The horse supports a number of saddles located at suitably spaced intervals in a series extending longitudinally of the floor 2 of the horse and each saddle is supported by a standard or upright including a lower tubular member 7 having a suitable base 8 secured upon the floor 2, and a member 9 which fits telescopically within the upper end of the member 7 and which is limited in its up and down movement by the projecting ends of a cross pin 10 which works in slots 11 formed in opposite sides of the member 7. A compression spring 12 is arranged within the lower portion of each member 7 and bears at its lower end upon the base 8 and at its upper end against the lower end of the member 9 and it will be understood that these springs serve to yieldably support the respective members 9 in elevated position but that when the glass cylinder is disposed within the saddles of the horse the members 9 of the standards may lower a greater or less distance according to the weight of the cylinder, thereby cushioning the engagement of the cylinder with the saddles when disposed therein and causing the saddles to adapt themselves to the cylinder whereby all of the saddles in the series will assist in supporting the cylinder. Each of the saddles proper includes a socket member 13 which is fitted to the upper end of the respective member 9 and held thereon by a set screw 14 and extending upwardly and laterally in opposite directions from each socket 13 are arms 15 which constitute the supporting members of the saddles and which are curved to conform to the curvature of the cylinder to be disposed thereon.

The supports for the bait and the reheating device are mounted upon a framework at the forward end of the horse and this framework includes side plates 16 mounted upon the frame 1 at the opposite sides of the forward end thereof. The plates 16 are provided with forward extensions 17 which support upstanding arms 18 having at their upper ends hollow portions 19 through which are adjustably fitted the rear ends of bars 20, the bars being secured at adjustment by means of set screws 21 which are threaded through the collars and bear against the said bars. By reference to Figs. 1 and 2 of the drawings it will be observed that the bars 20 extend forwardly beyond the arms 18 and they are located at such an elevation that when the horse is moved forwardly along the track the said bars will extend over the melting pot. The bars 20 support downwardly yieldable rests for the bait and each of these rests includes a standard member 22 which is fitted at its lower end in a socket 23 upon the respective bar 20 and is held at adjustment by means of a set screw 24. The member 22 is tubular and has telescopically fitted into its upper end a standard member 25 which is provided with a transverse pin 26 working in slots 27 in the opposite sides of the member 22, the said pin limiting the up and down movement of the member 25. A collar 28 is adjustably secured by means of a set screw 29 upon the member 22 and a spring 30 is disposed upon the standard members 22 and 25 and has its lower end bearing against the collar 28 and its upper end bearing against a collar 31 which is adjustably secured by a set screw 32 upon the standard member 25. The spring 30, of course, serves to yieldably support the standard member 25 in elevated position and lowering or downward movement of the member is, of course, yieldably resisted by the spring. The member 25 at its upper end supports a head comprising a wing 33 which is substantially vertically disposed and a wing 34 which is inclined downwardly and inwardly from the lower edge of the wing 33. As will be apparent by reference to Figs. 1 and 2 of the drawings, these heads are located opposite each other and the edges of the wings are designed to engage the cylindrical body of the bait when the bait is disposed within the reheater.

The electric leads for the bait are designed to rest in supports upon the bars 20 and each of these supports includes a standard comprising a tubular member 35 mounted at its lower end in a socket 36 upon the respective bar 20 and held at adjustment by means of a set screw 37. Telescopically fitted within the upper ends of the standard members 35 are standard members 38 the up and down movement of which is limited by the engagement of transverse pins 39 in slots 40 formed in the opposite sides of the respective members 35. A spring 41 is arranged upon each standard and bears at its lower end against a collar 42 adjustably held upon the member 35 and at its upper end against a collar 43 adjustably held upon the members 38. The member 38 of each standard is provided at its upper end with a head 44 and mounted upon this head is a bait block 45 having a seat 46 designed to receive one of the leads of the bait. The head 44 is insulated from the bait block 45 by a sheet of insulation 47 disposed between the said head and block and the block is provided at one side with an ear 48 which carries a binding post 49 to which is connected an electrical conductor wire 50. The wires 50 are led beneath the horse and are connected to the spindles 51 of contact rollers 52, which rollers are mounted in yokes 53 carried at the lower ends of standards comprising telescopic sections 54 and 55, the sections 55 of the two standards being secured to the underside of the frame of the horse and the section 54 being yieldably held in lowered position by means of a spring 56 which bears between collars 57 and 58 carried respectively by the sections 54 and 55. The yoke 53 is insulated, as at 59, from the standard section 54 and the rollers 52 engage contact rails 60 mounted upon insulating base strips 61, the rails 60 being located between the rails 5, as clearly shown in Fig. 4 of the drawings. It will now be understood that while the contact rollers 52 are in contact with the rails 60, current will be supplied to the bait blocks 45 and to the leads of the saddle when the saddle is disposed upon the reheater with its said leads resting in the said bait blocks.

A bait designed especially for use in conjunction with the horse and reheater heretofore described is clearly shown in Fig. 7 of the drawings and comprises a cylindrical body 62 provided upon its opposite sides with handles 63 and upon its closed upper end with a handle 64. The body 62 is open at its lower end and provided at its said end exteriorly with an outwardly projecting circumscribing flange 65. Supported beneath this flange and insulated therefrom is an annular ribbon 66 of a metal possessing a high degree of electrical resistance and it is to this ribbon that the glass adheres when the bait is lowered into the melting pot. In order that the ribbon may be heated to the desired degree of temperature, electrical leads, preferably comprising rods 67, are mounted upon the opposite sides of the body 62 in suitable attaching clamps 68 from which they are insulated, as indicated by the numeral 69. At their lower ends these leads 67 are connected electrically, as at 70, to the ribbon 66 and at their upper ends the leads extend above the upper end of the body 62 and have their extremities turned inwardly toward each other to provide hooks 71 which may be engaged with the raising and lowering cage of which a portion is illustrated in a general manner in Fig. 1 and indicated by the numeral 72.

In the use of the apparatus the horse is first moved along the track to a position suitably spaced from the melting pot and remains in this position while the cylinder is being drawn. After the cylinder has been drawn and severed at its lower end from the pot, the horse is moved along the track until its forward end, or, in other words, the bars 20, project over the melting pot. A band 72 is then fitted about the lower end of the cylinder and to the said band is connected any suitable cable and pulley device, such, for example, as indicated in general by the numeral 73, and illustrated in Fig. 1 of the drawings. The lower end of the cylinder is, by means of this device, then moved rearwardly above the horse as the raising and lowering cage is lowered and finally the cylinder is brought to rest upon the saddles of the horse, the body of the bait resting upon the supporting devices including the wings 33 and 34. Due to the weight of the cylinder and bait the same will lower until the projecting ends of the leads 67 rest in the seats 46 of the saddle blocks 45. Current will then be supplied from the conductor rails 60 to the said leads and finally to the ribbon 66 so as to maintain this element at the desired degree of temperature. The cylinder and bait are then separated in the usual manner by the capper and the bait is afterward manually lifted onto the cage and the drawing operation is repeated while the capper is acting upon the cylinder to cut the same into the desired lengths, the horse having been moved away from the melting pot a suitable distance to provide against interference with the drawing operation.

It will be understood, of course, that the horse will work with a cold bait equally as well as with a hot one.

Having thus described the invention, what is claimed as new is:

In apparatus of the class described, a cylinder supporting horse, supporting members mounted at one end of the horse, bearing socket members mounted upon the supporting members, standards vertically movably mounted in the socket members, springs yieldably supporting the standards against downward movement, and bait supporting heads mounted at the upper ends of the said standards.

In testimony whereof we affix our signatures.

CHARLES DONALDSON. [L. S.]
JOHN J. BLOXSOM. [L. S.]
JOHN K. BROOKS. [L. S.]